US008128069B2

(12) United States Patent
Reens

(10) Patent No.: US 8,128,069 B2
(45) Date of Patent: Mar. 6, 2012

(54) SYSTEM AND METHOD FOR HUMIDIFYING HOMES AND COMMERCIAL SITES

(76) Inventor: Daniel J. Reens, Trumbull, CT (US)

( * ) Notice: Subject to any disclaimer, the term of this patent is extended or adjusted under 35 U.S.C. 154(b) by 1090 days.

(21) Appl. No.: 11/966,539

(22) Filed: Dec. 28, 2007

(65) Prior Publication Data

US 2008/0157409 A1 Jul. 3, 2008

Related U.S. Application Data

(63) Continuation-in-part of application No. 11/082,726, filed on Mar. 17, 2005, now abandoned.

(60) Provisional application No. 60/555,473, filed on Mar. 23, 2004.

(51) Int. Cl.
*B01F 3/04* (2006.01)

(52) U.S. Cl. ........... 261/30; 261/78.2; 261/81; 261/116; 261/DIG. 48

(58) Field of Classification Search .................... 261/30, 261/76, 78.2, 81, 116, 118, DIG. 48
See application file for complete search history.

(56) References Cited

U.S. PATENT DOCUMENTS

| | | | |
|---|---|---|---|
| 3,594,128 | A | 7/1971 | Singleton |
| 3,989,042 | A | 11/1976 | Mitsui et al. |
| 3,990,427 | A | 11/1976 | Clinebell |
| 4,031,171 | A | 6/1977 | Asao et al. |
| 4,238,425 | A | 12/1980 | Matsuoka et al. |
| 4,257,989 | A | 3/1981 | Nishikawa |
| 4,318,062 | A | 3/1982 | Mitsui et al. |
| 4,359,697 | A | 11/1982 | Takahashi |
| 4,572,428 | A | 2/1986 | Groff et al. |
| 4,612,777 | A | 9/1986 | Noma et al. |
| 4,641,053 | A | 2/1987 | Takeda |
| 4,671,456 | A | 6/1987 | Groff et al. |
| 4,724,104 | A | 2/1988 | Kim |
| 4,732,326 | A | 3/1988 | Bessling et al. |
| 4,752,423 | A | 6/1988 | Wong |
| 4,852,363 | A | 8/1989 | Kampf et al. |
| 4,913,856 | A | 4/1990 | Morton |
| 4,986,937 | A | 1/1991 | Sorio |
| 5,350,117 | A | 9/1994 | Kleinberger et al. |
| 5,372,753 | A | 12/1994 | Morton |
| 5,407,604 | A | 4/1995 | Luffman |

(Continued)

OTHER PUBLICATIONS

Humidification Solution Source, Bulletin No. 596, 2002 Armstrong International, Inc. pp. 92, 94, 124, 125, 132, 138.

*Primary Examiner* — Charles Bushey
(74) *Attorney, Agent, or Firm* — St. Onge Steward Johnston & Reens LLC

(57) ABSTRACT

Various embodiments are described for humidifying an air stream in a duct are described. In one form the duct is part of a humidification system in a building such as a residence or commercial structure while in another form the duct is part of a standalone unit. The described embodiments use ultrasonic elements for generating a mist composed of droplets and fog and the fog is drawn or pushed by an air stream towards a duct. The duct utilizes a dispersal structure formed of one or a plurality of tubes with openings and distributed at least partly across the duct so that the air stream in the duct can entrain the fog and distribute this in manner whereby the fog can quickly dissipate and evaporate for humidification of the air stream.

13 Claims, 14 Drawing Sheets

U.S. PATENT DOCUMENTS

| | | | | |
|---|---|---|---|---|
| 5,524,848 | A | 6/1996 | Ellsworth | |
| 5,551,416 | A | 9/1996 | Stimpson et al. | |
| 5,653,919 | A | 8/1997 | White et al. | |
| 5,677,982 | A | 10/1997 | Levine et al. | |
| 5,699,983 | A | 12/1997 | Ellsworth | |
| 5,702,648 | A | 12/1997 | White et al. | |
| 5,762,661 | A | 6/1998 | Kleinberger et al. | |
| 5,806,762 | A * | 9/1998 | Herr et al. | 236/44 A |
| 5,832,176 | A | 11/1998 | Jung | |
| 5,873,357 | A | 2/1999 | Lake | |
| 5,922,247 | A | 7/1999 | Shoham et al. | |
| 6,053,482 | A | 4/2000 | Glenn et al. | |
| 6,092,794 | A | 7/2000 | Reens | |
| 6,102,992 | A | 8/2000 | Berg et al. | |
| 6,244,576 | B1 | 6/2001 | Tsai | |
| 6,357,671 | B1 | 3/2002 | Cewers | |
| 6,511,050 | B2 | 1/2003 | Chu | |
| 2004/0163536 | A1 * | 8/2004 | Baudat et al. | 95/214 |

* cited by examiner

FIG 9
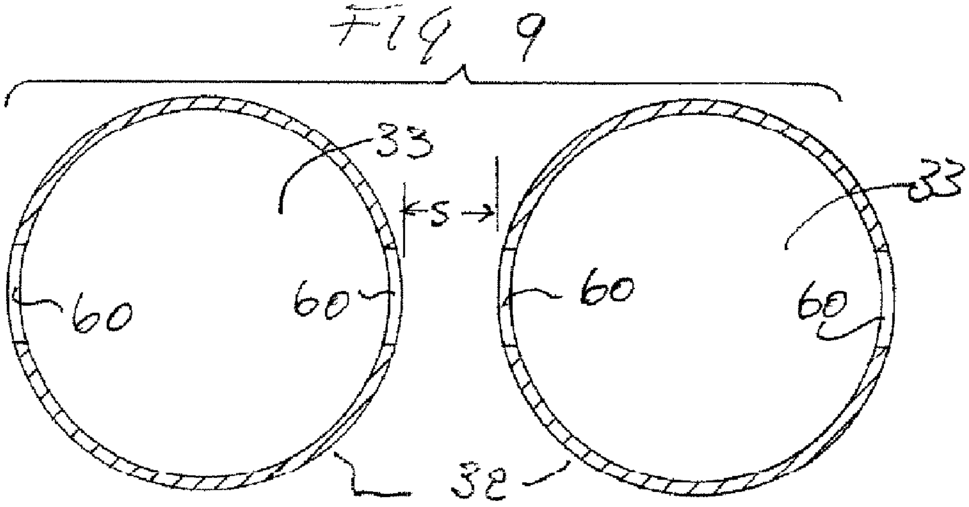
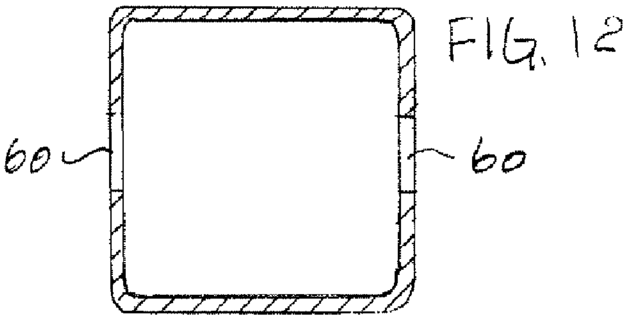
FIG. 12
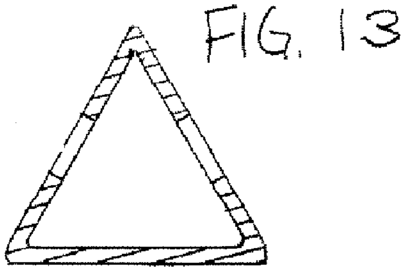
FIG. 13
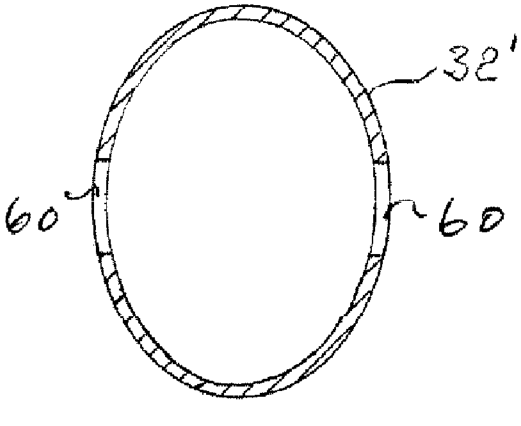
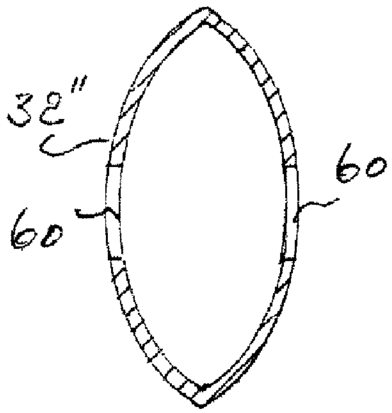
FIG 10
FIG 11

SYSTEM AND METHOD FOR HUMIDIFYING HOMES AND COMMERCIAL SITES

PRIOR APPLICATION

This application is a continuation-in-part of U.S. patent application Ser. No. 11/082,726 filed on Mar. 17, 2005, now abandoned, which in turn claims the benefit of, under Title 35, United States Code, Section 119(e), U.S. Provisional Patent Application No. 60/555,473, filed on Mar. 23, 2004, both of which are incorporated by reference herein in their entireties.

FIELD OF THE INVENTION

This invention generally relates to a method and apparatus for the humidification of a home or a commercial site or specific zone within a larger facility such as an office or lab or other industrial facility and for the humidification of a process. More specifically this invention relates to the humidification of a moving gas stream, such as air or other gas, and further relates to a control for such humidification.

BACKGROUND OF THE INVENTION

The humidification of air streams is well known using various techniques. In accordance with one technique as described in my U.S. Pat. No. 6,092,794, foggers which are supplied with pressurized air and water, create a fog that evaporates inside a stream of air that is led through ducts to areas that need to be humidified. The insertion of water fog can also be done, as is well known, by passing the air stream over a wet medium from which humidification is obtained.

Humidifiers for homes are on the market and which employ a so-called by-pass technique wherein a small percentage of a home's return air is by-passed through a passive wetted media and then re-introduced with water vapor from the media added into the supply side of the air flow. Typically, by-pass humidifiers are activated only during the time that the furnace is operating; thereby failing to provide adequate humidification during off-times of the furnace. The by-pass humidifiers also only humidify a small percentage of the total air flow that runs through the ductwork, thus reducing their effectiveness and their ability to attain set point levels. The by-pass humidifiers allow standing water to remain on both the wetted media and in their tanks, thereby encouraging unwanted microbial growth.

Humidification of air flowing through a duct is known in the art, and has been practiced with the use of steam vapor. For example, in one application of steam to humidify air, steam vapor is produced in a self contained steam generator from which steam vapor is fed through piping to a dispersion tube placed within a duct. The dispersion tube has small apertures through which the steam vapor is discharged into the air stream flowing through the duct. One or several dispersion tubes can be used. The steam vapor is typically under some pressure so that small apertures in the dispersion tube are used to discharge the steam vapor in the duct. Steam tends to require a substantial amount of energy to produce and its operating costs are, therefore, considerable particularly when generated with electric heaters. In addition steam tends to wet cool surfaces in the vicinity of its introduction into a duct and care must be taken to avoid the accumulation of water in the duct.

In U.S. Pat. No. 5,653,919 a humidification system is described in which a plurality of piezo-electric ultrasonic elements are located in a separate humidifying sub chamber which in turn is part of a larger chamber that is mounted on or inside a main air duct. The elements generate moisture laden columns of mist and water droplets which are permitted to pass through apertures in a plate for evaporation into a portion of an air stream available at an inlet port of the chamber. The humidified air is then introduced into a main air duct.

As described in the '919 patent the cross-sectional area of the humidifying chamber is made larger than that of the inlet port so as to slow the air stream speed and avoid carrying large un-evaporated droplets into the main air duct and thus enable large droplets to drain back into the reservoir of liquid located over the ultrasonic elements.

Various devices are described in the '919 patent to divert incoming air flow from directly impacting the liquid columns from the ultrasonic elements and retard the liquid mist they generate from exiting the humidifying chamber.

A similar system to that in the '919 patent is described in U.S. Pat. No. 5,702,648 wherein a stand alone humidifier unit is shown. This has an elongate zigzagged shaped humidification chamber whose effective length is at least seven feet in order to assure complete evaporation of the mist produced from ultrasonic mist elements.

In U.S. Pat. No. 4,986,937 an ultrasonic humidifier is shown, which is mounted in an air duct of a heating system. The water level covering the transducer is controlled with the use of a magnet that is mounted on a float valve to prevent actuation of the fogging system when the water level in a reservoir, in which the transducer is located, is too low.

In U.S. Pat. No. 6,511,050 a humidifier is described in which an ultrasonic transducer is mounted in water at the bottom of a vent stack and a fan is employed to drive air through the stack to its upper open end and thus deliver mist to a room. A vent stack is employed to control the water level over the transducer in the mist stack.

Other ultrasonic humidifiers are shown and described in U.S. Pat. Nos. 4,031,171; 4,752,423; 5,873,357; 5,832,176 and 6,244,576 B1.

Though these prior art devices may humidify air, they are not necessarily sufficient, both in an operational reliability and economic sense, for the humidification of residences, commercial and zoned facilities. Also, many of these devices generate a long plume of un-evaporated mist stream, thus requiring a long and large chamber to assure full evaporation and avoid condensation of water onto the walls of the duct.

What is needed, therefore, is a humidification apparatus that is reliable in achieving desired humidity levels and effective in producing humidification of a gas stream in a small space, avoids standing water and wetted media and accurately controls humidity levels. This can be particularly important in commercial sites such as semiconductor manufacturing plants and other manufacturing processes in which different types of gases need to be humidified with a particular liquid.

SUMMARY OF THE INVENTION

With a humidification apparatus in accordance with the invention, an air stream is directly humidified in an unusually short distance by the complete evaporation of a stream of fog. This is achieved so that little if any moisture is condensed on the walls of a duct into which the fog is introduced. In accordance with one form of the invention a plurality of mist producing elements are deployed within a chamber that is in flow communication with a fog dispersal structure located within and distributed at least partly across the gas stream that is to be humidified. The mist in the chamber is composed of small droplets and fog. As the gas stream in the duct flows past the tubes and their apertures, fog is entrained or drawn up from the mist produced by the elements through the dispersal structure into the gas stream. This leaves heavier droplets behind while the resulting fog is distributed across the gas stream. The fog quickly dissipates and directly evaporates as vapor within the gas stream.

With a humidification system in accordance with the invention a direct humidification of an air stream is achieved, thus avoiding the drawbacks of by-pass humidifiers while providing a reliable and accurate humidification of the gas stream and thus the areas to which the gas stream is supplied.

The dispersal structure can be formed of a plurality of hollow dispersal tubes located in the duct and thus in the path of the air stream flow in the duct. The tubes have apertures along their lengths to enable the injection of fog throughout the cross-sectional area of the duct. The apertures can have any shape. The air stream in the duct entrains the fog emerging from the apertures to enable the fog to fully evaporate within the air stream in a short distance from the dispersal structure.

In one embodiment of the invention the mist producing elements are located remotely from the dispersal structure to facilitate installing of the humidification system. In another embodiment of the invention the mist is formed in a chamber that is located adjacent to the fog dispersal structure. When fog is generated at a remote location from the duct it is conveyed to the duct through a conduit sized to deliver fog without droplets to the duct. This configuration is particularly advantageous for simplifying installation and construction of a humidification system of this invention.

In another embodiment in accordance with the invention the fog in the mist is conveyed via a conduit such as a duct or a tube to a dispersal structure that may be located either inside a duct containing a flow of air or into a room to be humidified. When the mist generating elements are remotely spaced from the duct to be humidified a fan can be used to assist the movement of the fog to the dispersal structure. This approach can be particularly effective in avoiding the injection of droplets into the area to be humidified and simplifies the construction as well as the installation of the humidification system. The use of the fan enables an appropriate pressurization of the container in which the mist generating elements are located to a level that is sufficient to overcome air pressure inside the duct to be modified. In this manner a humidification system in accordance with the invention can be place within an air supply duct as well as an air return duct used to convey air conditioned air to a building.

In another embodiment in accordance with the invention, a diverter is placed inside the duct containing the air stream so as to divert a portion of the air stream that is then used for the movement of fog generated by the elements in a separate container towards the air stream in the duct. Alternatively as described in connection with another embodiment of the invention, instead of a diverter, a fan is used to set up a flow of air through the container in which the mist producing elements are located to deliver fog through the dispersal structure into the air stream.

As described herein, a dispersal structure can be in the form of dispersion tubes, which need not be cylindrical but can have other than circular cross-sectional shapes such as oval, or square or hexagonal or triangular or other multifaceted shapes. The terms "tubes" or "dispersion tube" as used herein, therefore, mean a hollow, apertured, device used to disperse fog directly into a gas stream from the apertures and thus may incorporate anyone of these shapes as well as such other cross-sectional shapes as may occur to one skilled in the art.

The dispersal structure can, as shown with regards to another embodiment, extend sideways in a vertically oriented duct. The mounting of the dispersal tubes may thus accommodate different orientations and techniques for injecting fog into the air stream and can in this manner also conveniently accommodate a stand alone humidifier.

One particular advantageous feature of one embodiment is the attachment of electronic drive circuits for the mist generating elements to the duct containing the gas stream so that the humidified and thus also cooled gas can advantageously cool the heat sink to which these drive circuits are mounted and thus more effectively cool these circuits.

Although the embodiments shown herein are particularly oriented at the humidification of an air stream with a stream of water fog, it is to be understood that other gases can be humidified with a liquid fog as may be required in various industrial applications.

It is, therefore, an object of the invention to provide a method and system for humidifying a gas stream with a fog that evaporates in a short distance in the gas stream.

It is a further object of the invention to provide a system and method for humidifying an air stream flowing through a duct with a fog to thus humidify rooms or zones to which the duct leads.

It is still a further object of the invention to provide a system and method for humidifying a room or zone using a fog in an efficient and effective manner.

It is a further object of the invention to humidify a residence or zone with a fog producing system that is quiet, effective in regulating the humidity level and dependable.

It is still further an object of the invention to provide a humidification system and method for humidifying wherein a humidifying fog is essentially uniformly introduced throughout an air stream so that it can vaporize in a short distance with a minimum of condensation onto walls of the duct in which the air stream flows.

BRIEF DESCRIPTION OF THE DRAWINGS

These and other objects and advantages of a humidification system and method in accordance with the invention can be understood from the following description of several embodiments as shown in the drawings wherein:

FIG. 9 is a partial enlarged cross-sectional view of adjacent dispersal tubes used in the system of FIG. 2.

FIGS. 10, 11, 12 and 13 are cross-sectional views of alternate shapes of dispersal tubes that can be used in the dispersal of fog throughout a gas stream in accordance with the invention.

DETAILED DESCRIPTION OF THE INVENTION

Figure 1:
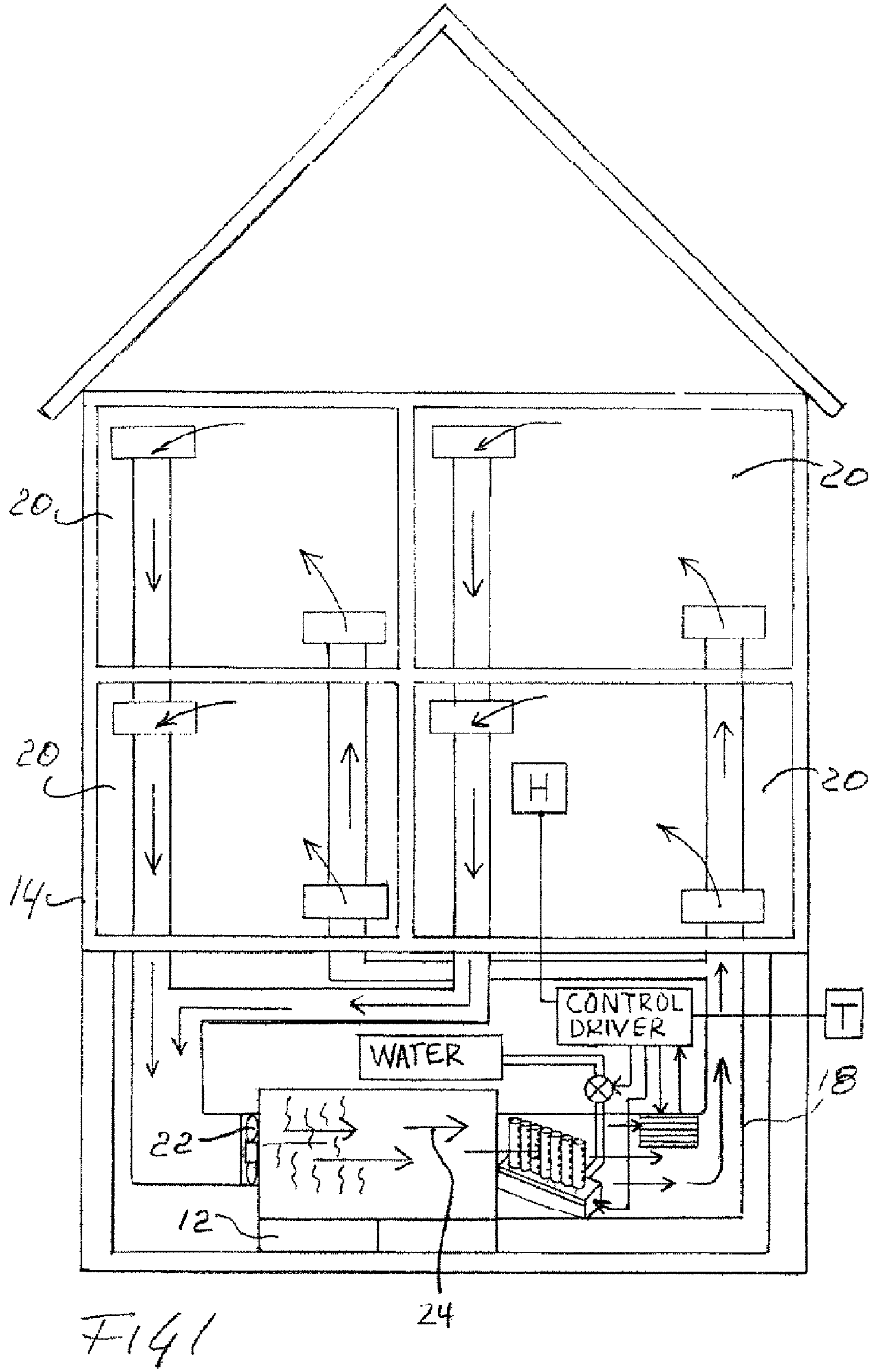
FIG. 1 is a vertical schematic sectional view of a home to be humidified with a system in accordance with the invention.

With reference to FIG. 1 a humidification system 10 in accordance with the invention is shown in place inside a conventional central air system 12 in a residence 14. The humidification system 10 is mounted inside a duct 18 that leads to various rooms 20 in the residence 14. The duct 18 can be a typical duct as is commonly used in a central air system as found in residences or other commercial and industrial facilities. The central air system uses a fan 22 to generate an air stream, as suggested by arrows 24. The air stream is typically heated, with a heater, not shown, and humidified in cold dry weather by system 10. The duct 18 preferably is part of the supply duct though it could also be part of the return duct.

As shown in FIGS. 2A, and 3 through 9 the humidification system 10 includes a container 26 that holds a shallow reservoir of water 28 having a chamber 30 that communicates with a fog dispersal structure 29 formed with a plurality of hollow dispersal tubes 32 that are distributed to extend into and at least partly across the duct 18. The tubes 32 have bores 33 to enable fog 62 to rise from inside container 26 and pass through openings 60 into the air stream 24. A plurality of mist producing elements 34 are mounted in container 26 within the reservoir 28. The elements are piezo-electric devices 34 that are connected by cables 36 to electronic drive circuits 38, see FIG. 8, mounted inside a box 39 to a heat sink 40. The heat sink 40 is located inside duct 18 downstream of the dispersal tubes 32 in duct 18 so that the drive circuits can be kept at a sufficiently low temperature for reliable operation. When container 26 is used to deliver fog to a supply duct, container is preferably sealed to avoid fog leakage from the operation of a fan used to pressurize the container above the air pressure within the supply duct.

Figure 5:
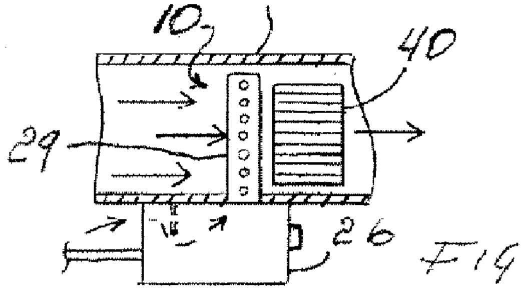
FIG. 5 is a schematic side view in elevation of a modified version of the humidification system of FIG. 2 with the mist generating section located outside the duct below the dispersal structure inside the duct.
Figure 7:
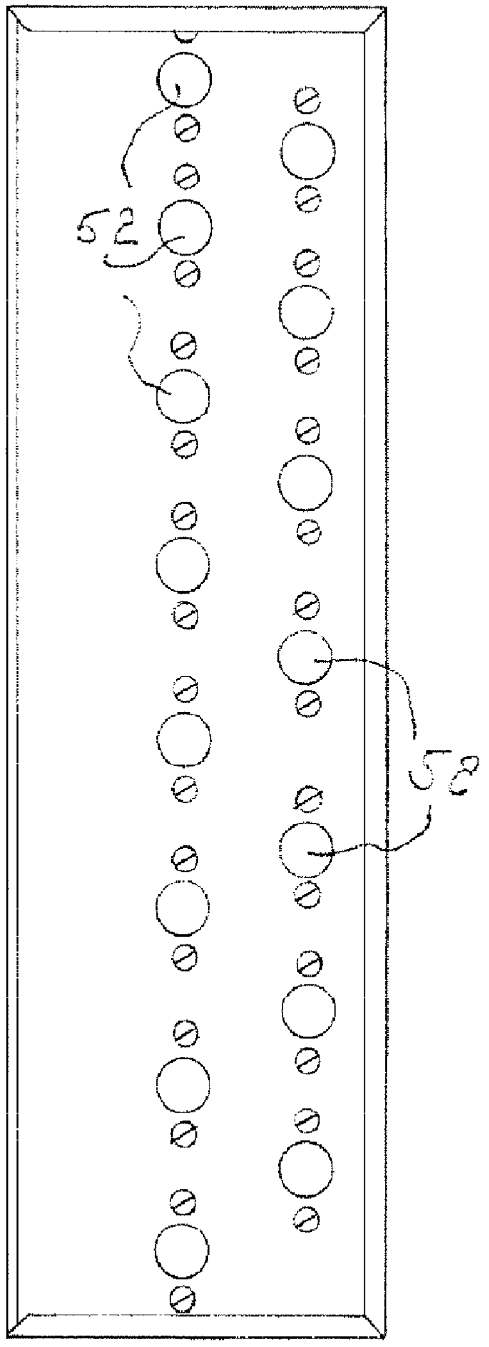
FIG. 7 is downward plan view of a container used to mount piezo-electric elements used to generate mist for humidifying a gas stream in accordance with the invention.

In the embodiment of FIG. 5, the container 26 is mounted to a bottom duct wall and located outside the duct 18 while the dispersal structure 29 extends from the container 26 into the duct 18.

Though piezo-electric elements 34 are preferred, other mist producing devices can be used such as spray nozzles and other well known nebulizing devices. The piezo-electric elements 34 are well known and can be obtained from the APC International, Ltd of Mackeyville Pa. as its 2.4 MHz nebulizer and with an associated drive circuit board 38. These nebulizers are sold by APC International for humidifiers, climate controls, mist and fog generators.

The humidification system 10 also includes a control 42 coupled via a cable 44 to drive circuits 38 to turn the drive circuits on and off in accordance with a humidification signal from a humidistat 46 that is located in a space 20 to be humidified. An outside temperature sensor 48 is used to limit humidification levels during very cold outside air temperatures when too much humidification in a space 20, see FIG. 1, would result in excessive condensation onto inside surfaces of windows. The outside temperature sensor 48 is not essential for the operation of humidification system 10.

Inside container 26 are a plurality of wells 52 which contain flat piezo-electric elements 34 while the reservoir of water 28 has sufficient depth to fill wells 52 and submerge elements 34. The depth of the water is preferably kept sufficiently small to provide an efficient nebulization of water from the action of the piezo-electric elements 34. The elements 34 generate a liquid mist composed of fog and water droplets with the fog being drawn upwardly through openings 56 in the container 26 upper surface 56 and into the hollow dispersion tubes 32. The droplets tend to fall back into the water with some being prevented from escaping container 26 by a baffle 58 spaced from air inlet 59 in container 26.

The term fog as used herein denotes a composition of fine non-vaporized liquid particles that are readily conveyed by an air flow. The fog liquid particles are easily evaporated and can be distinguished from steam vapor used to humidify air with prior art humidifiers. Fog particles do not require an input of energy for evaporation, as is needed to generate steam, but instead draw energy from the gas stream being humidified for fog particle evaporation. This is the reason that the use of fog also frequently yields a benefit because its evaporation cools the air stream in a noticeable manner.

Figure 2A:
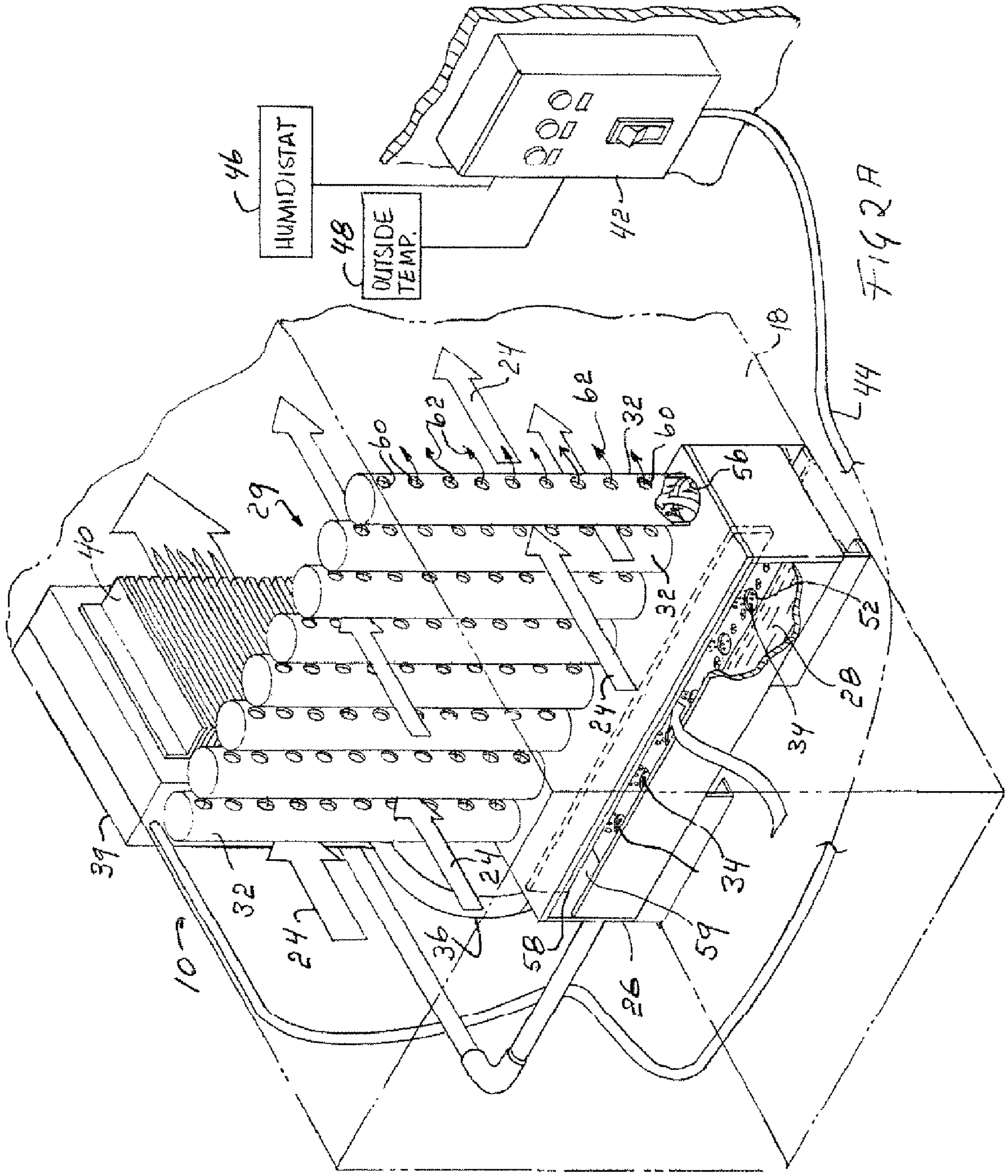
FIG. 2A is an enlarged partial perspective view of an early experimental humidification system and method in accordance with the invention.
Figure 6:
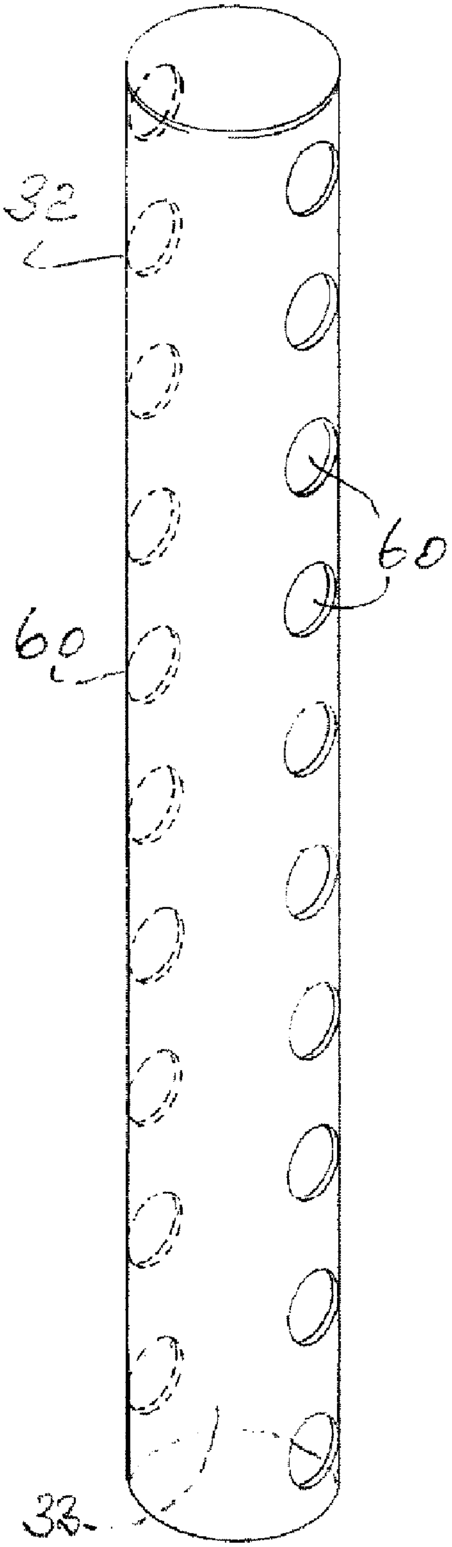
FIG. 6 is a side view in elevation of a dispersal tube used to disperse fog into a gas stream in accordance with the invention.
Figure 8:
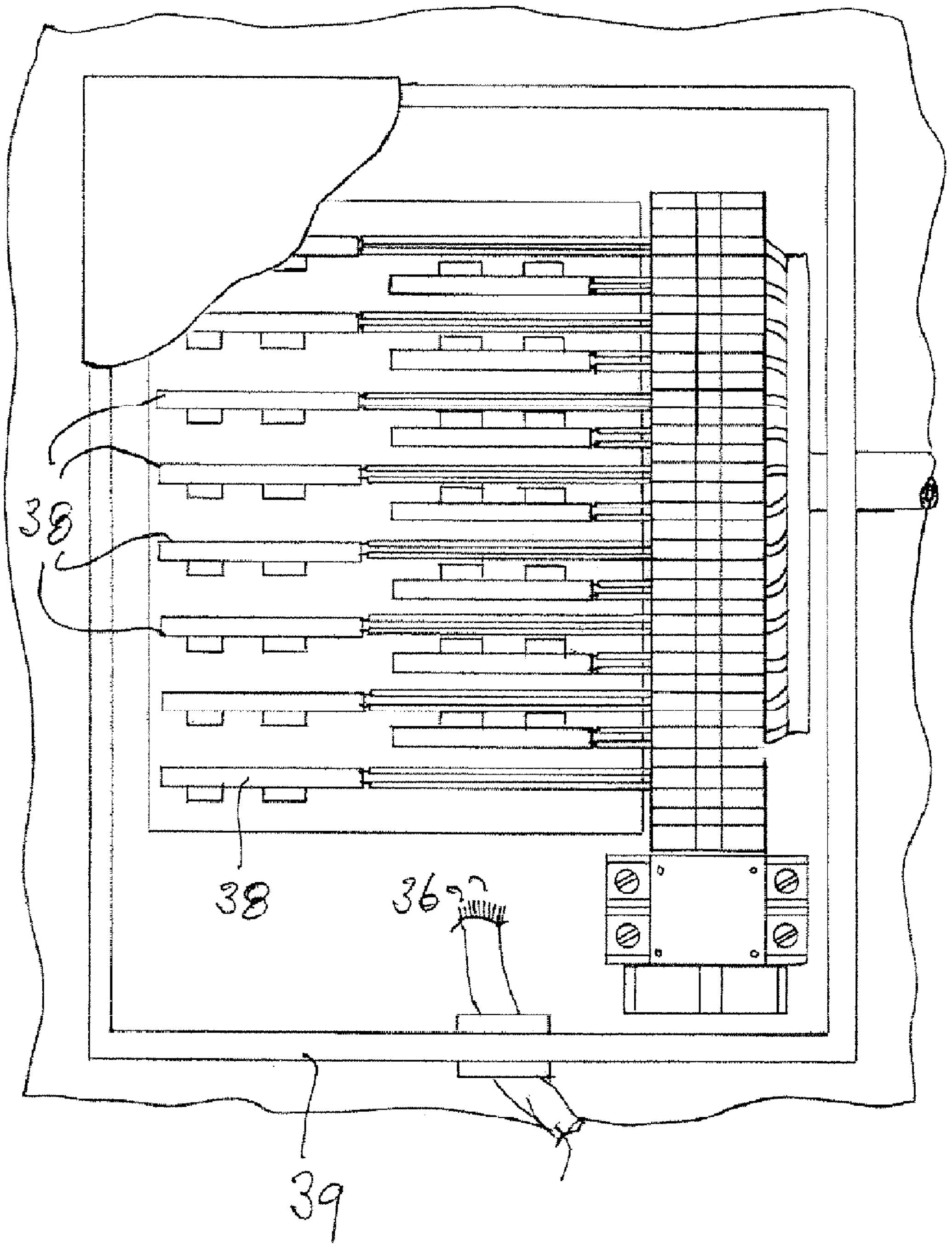
FIG. 8 is a side view in elevation of an assembly of a heat sink and drive circuit boards used to drive the piezo-electric elements employed to generate a mist for the humidification system in FIG. 2.

Dispersion tubes 32 have fog openings 60 distributed along their lengths with the tubes 32 being oriented to enable the air stream 24 to entrain fog 62, see FIG. 2A, through openings 60 for mixing with the air stream 24. As shown in FIG. 6, the dispersion tubes have openings 60 on opposite sides to facilitate an air stream 24 to entrain fog rising within the bores of the tubes 32. Dispersion tubes 32 are distributed at least partly across the cross-sectional area of duct 18 and spaced from each other so that fog tends to be distributed in an almost uniform manner for an even injection of fog 62 into air stream 24. Openings 60 are shown as circular, however, it should be understood that other shapes such a slot or others can be employed.

The fog openings 60 are sufficiently large to facilitate the dispersal of fog with very little pressure to enter the air stream 24. If the apertures 60 are too small, the mass flow with the fog tends to be obstructed and requires some pressure to be discharged. If the apertures 60 are too large then an even discharge distribution along the length of a dispersion tube 32 from the openings is not achieved. In one embodiment the diameters of the apertures 60 was about one half inch. It should be understood, however, that the diameters of the openings 60 may vary and that a dispersal structure may utilize apertures 60 of different sizes.

The fog introduced from the tubes 32 evaporates very quickly and in a relatively short distance that can be of the order of several feet from tubes 32 and typically is less than 6 feet from the tubes.

In a preferred form of the invention, for ease of manufacture as well as installation, a humidification system in accordance with the invention involves a separation of the liquid container 26 from being integrally mounted with the dispersal structure 29 in duct 28. Such separation accommodates size and weight limitations as may arise from the liquid container's attachment inside or to a duct. In such configuration of a humidification system of this invention the liquid container 26 can be mounted on the floor or to a wall or in such other location while a conduit of appropriate size is used to convey fog produced inside the liquid container to the duct and/or to a dispersal structure 29. FIGS. 2B, 2C, 2D, 2E and 2F illustrate such forms of the invention in different configurations.

Figure 2B:
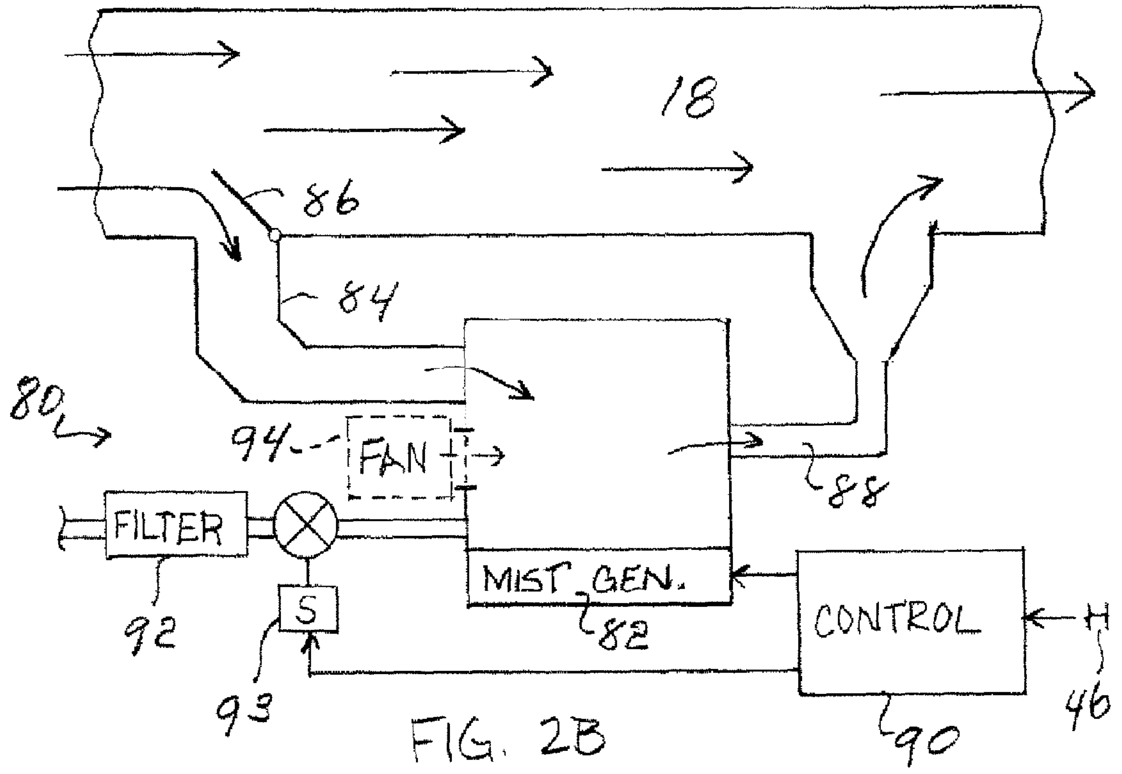
FIG. 2B is a schematic view of an alternate humidification system in accordance with the invention.

As shown in FIG. 2B with a humidification system 80, the fog is generated inside a mist generator 82 with air from duct 18 being drawn in through a conduit 84 with a deflector 86 serving to steer a small portion of the air flow through duct 18 towards the mist generator 82. Fog is then conveyed through a conduit 88 back into duct 18 without the use of a fog dispersal structure as shown in FIG. 2A. This system has the advantage of building the major components of system 80 at a factory while simplifying the installation of the system. A control 90 is used to control the mist generator and water is supplied from a tap or other supply through a filter 92, such as a reverse osmosis filter. The supply of water is regulated by control 90 and through a solenoid controlled valve 93 to maintain a relatively shallow water level over the piezoelectric mist generators.

Figure 2C:
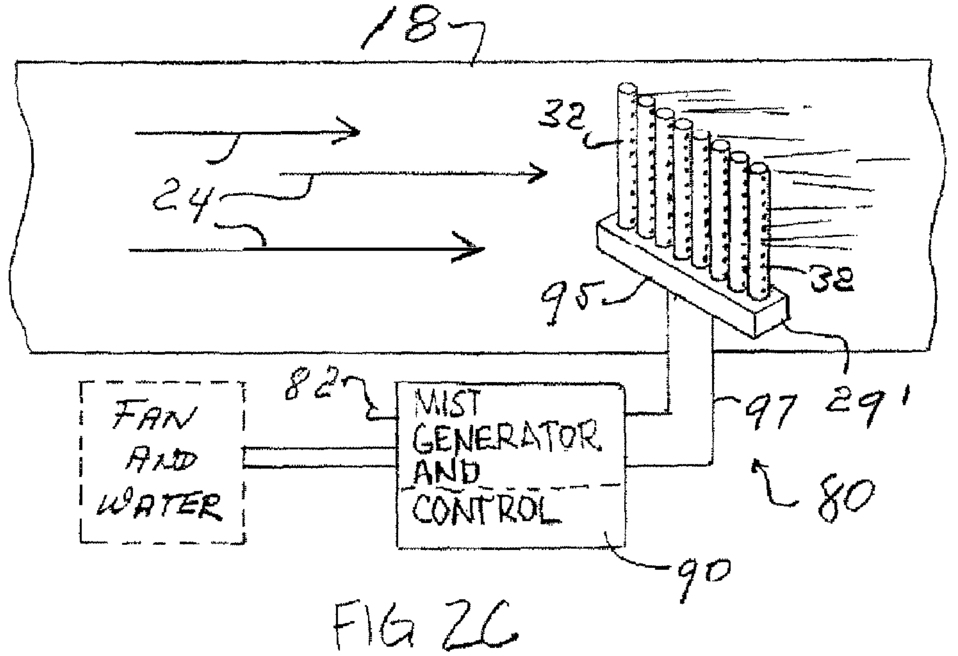
FIG. 2C is a schematic view of another form of a humidification system in accordance with the invention.

Alternative to the use of the conduit 84 and deflector 86 in FIG. 2B is the use of a fan 94 to deliver an air stream through the mist generator 82 to duct 18. The fan typically provides sufficient pressure to drive fog from the mist generator into the fog dispersal structure. The static duct pressure is not large, typically less than several inches of water and thus near the ambient air pressure that exists outside the mist generator 82. When the fog dispersal structure is located inside the return air duct, the pressure inside that duct is less than the supply duct and thus it becomes easier to introduce fog into the return duct though that part of the duct could also have a slight elevated static pressure above ambient. Also alternatively, the fog produced in the embodiment shown in FIG. 2B can be delivered into a fog dispersal structure 29' mounted within the duct 18 as shown in FIG. 2C. The fog in this case is delivered into a suitable manifold 95 on which the dispersion tubes 32 are mounted. When the mist generator needs to be pressurized it usually also is preferably properly fog-sealed to avoid leakage of fog and liquid.

Figure 2D:
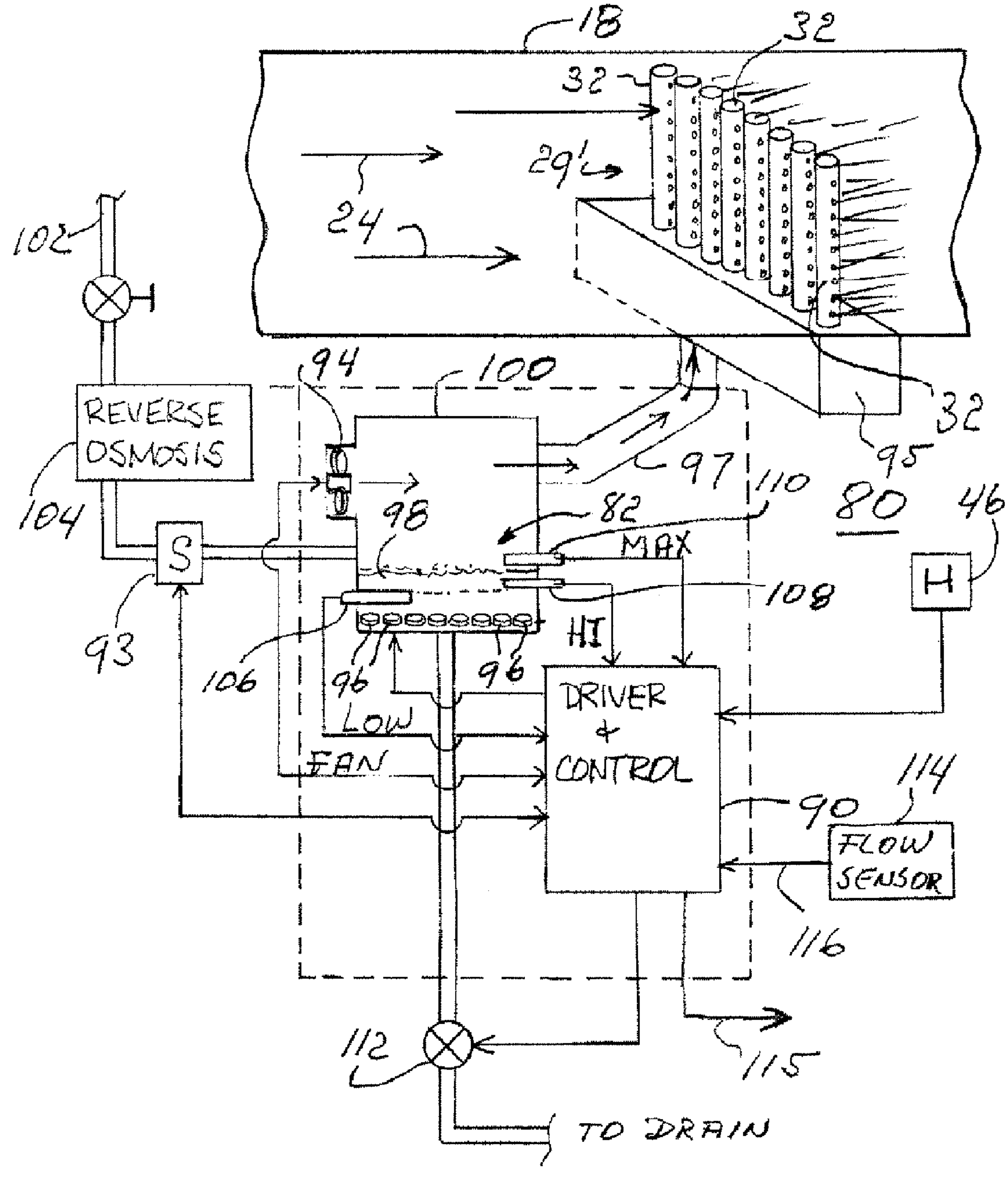
FIG. 2D is a schematic view of still another form of a humidification system in accordance with the invention.
Figure 2E:
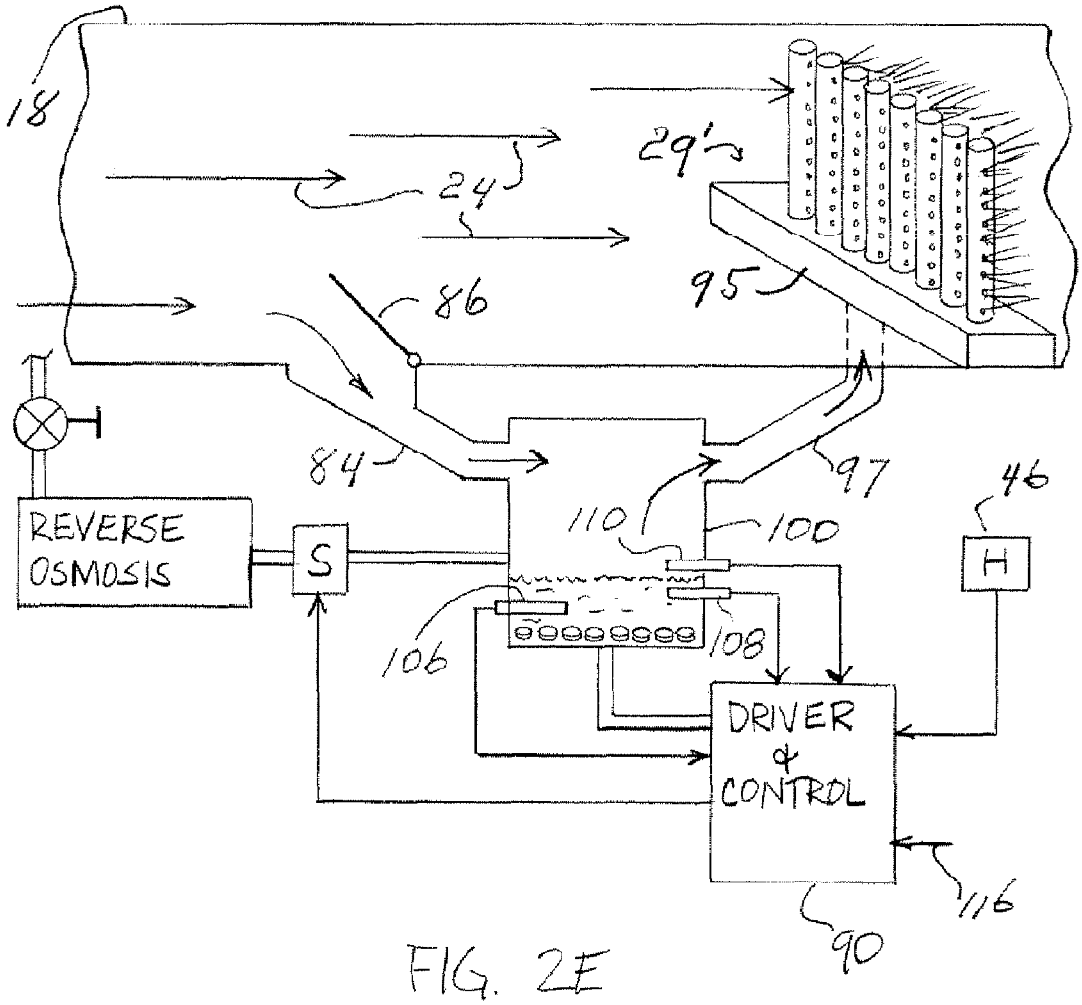
FIG. 2E is a schematic view of another form of a humidification system in accordance with the invention.
Figure 2F:
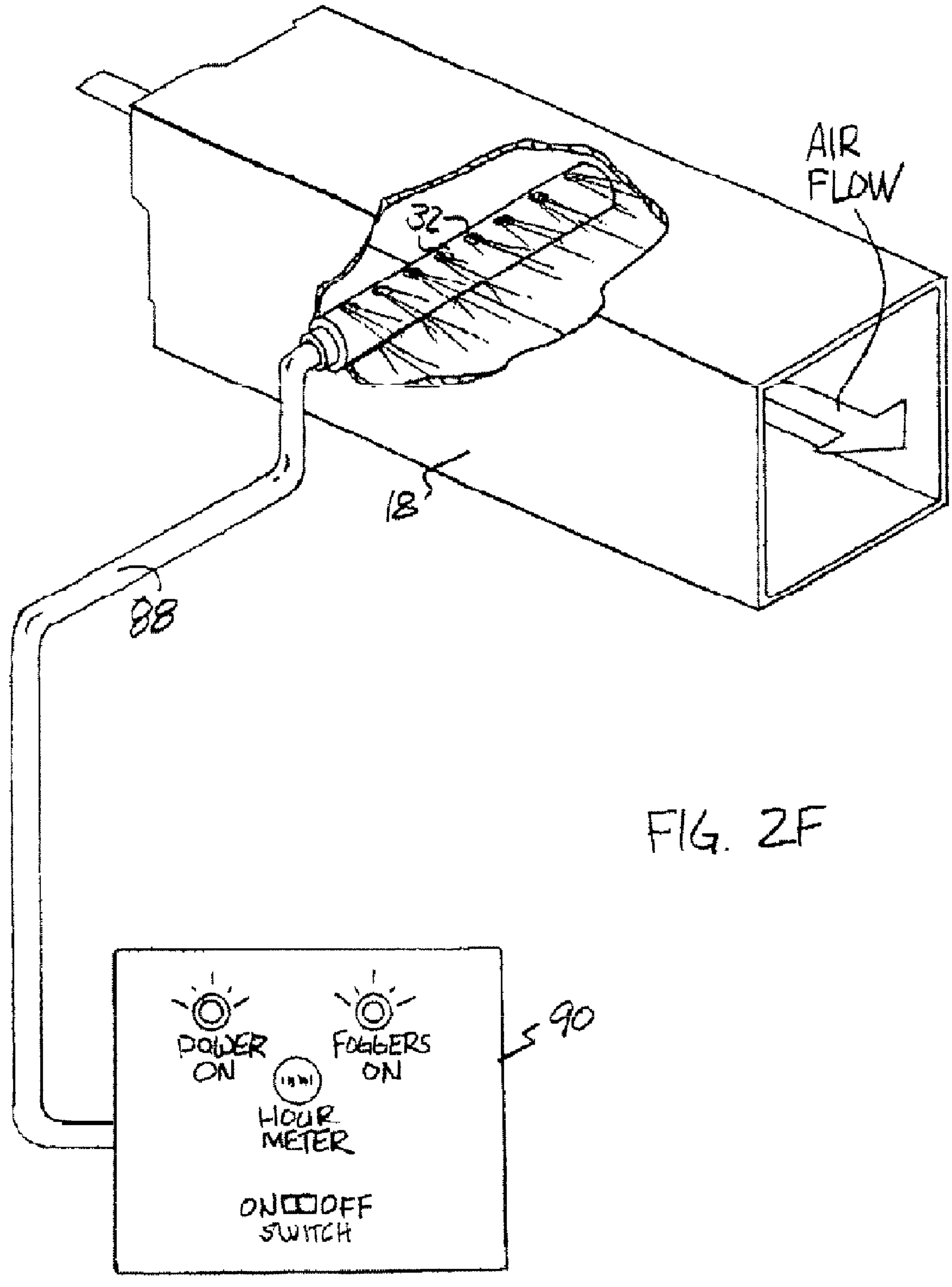
FIG. 2F is a schematic view of another form of a humidification system in accordance with the invention.
Figure 3:
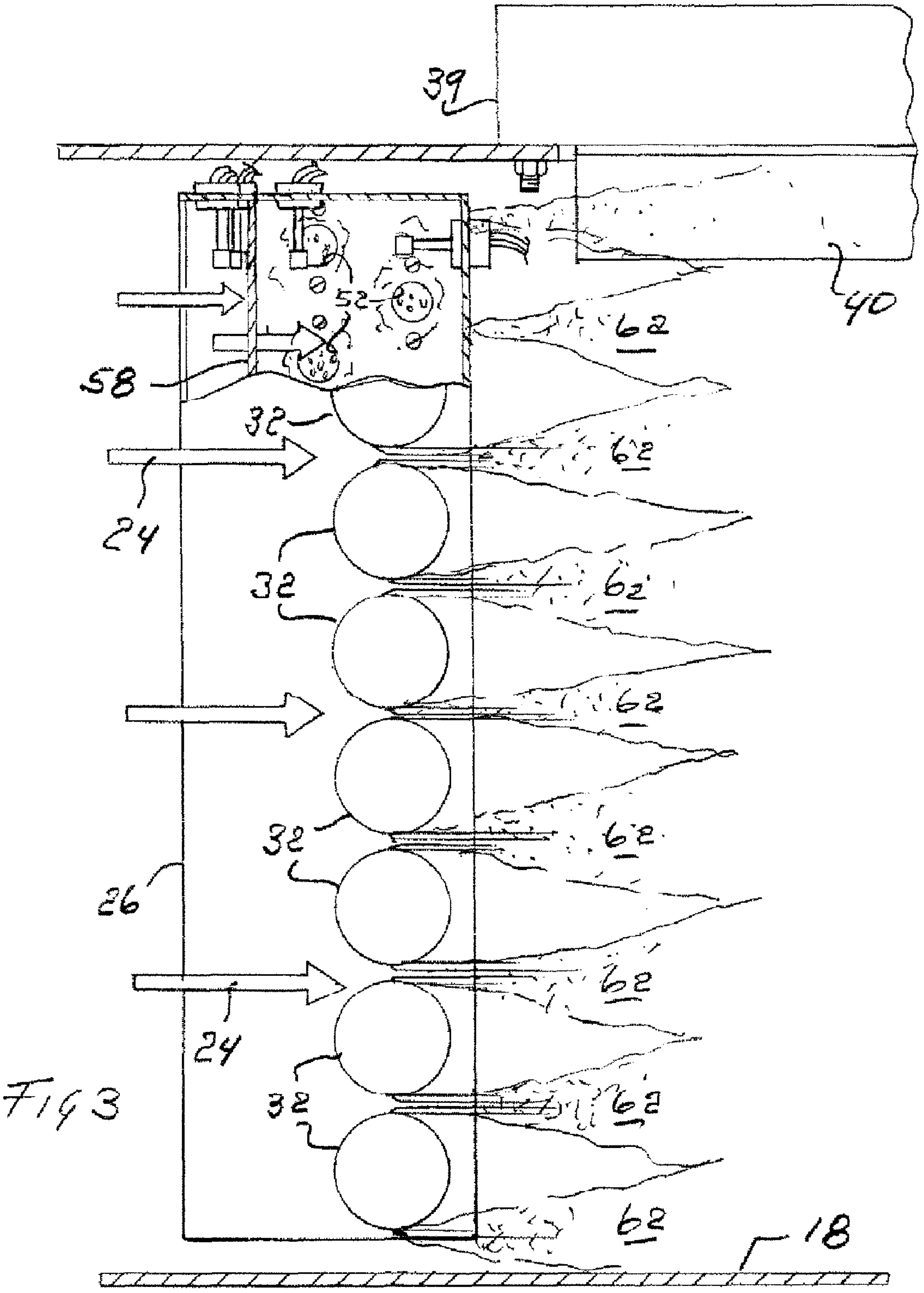
FIG. 3 is a vertically downward plan view of the system of FIG. 2.
Figure 4:
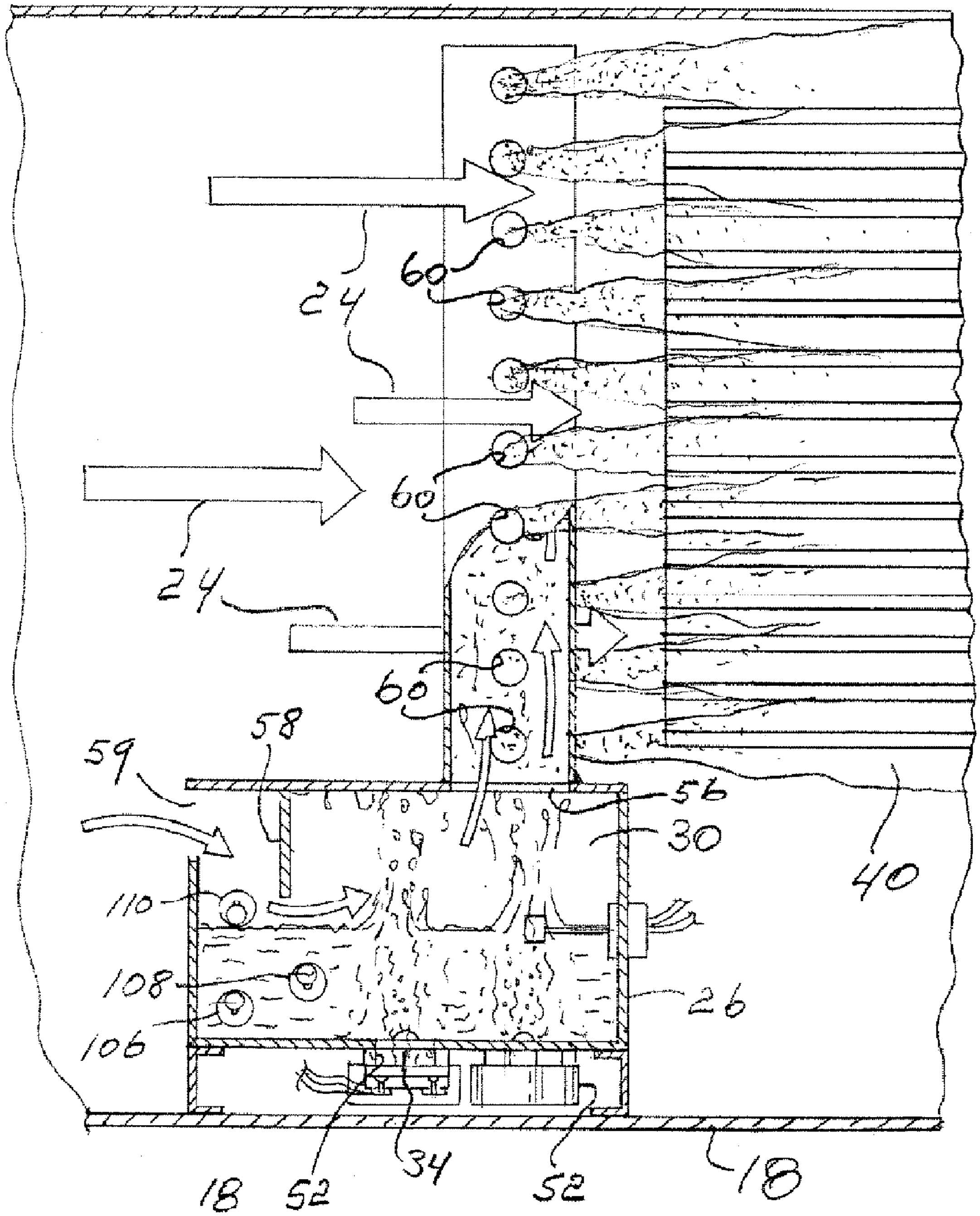
FIG. 4 is a side view in elevation of the system of FIG. 2.

FIG. 2D illustrates system 80 of FIG. 2C with greater detail. A fog dispersal structure 29' is shown mounted inside duct 18 and is supplied with fog from a fog generator 82 through a conduit 97. This uses a plurality of piezoelectric device 96 operated at a high frequency to emulsify water 98 inside a container 100. Water is obtained from a typical house tap 102 after being passed through a reverse osmosis filter 92 used to remove those ingredients in the water supply that would otherwise enter the air stream as dust after fog has evaporated. The reverse osmosis filter 92 can be an ordinary commercially available filter with sufficient water pass-through capability to humidify premises such as shown in FIG. 1.

Water level is maintained inside container 100 with a control 90 that uses water level sensor 106, set for sensing the minimum acceptable water level, a high water level sensor 108 and a maximum acceptable water level sensor 110. Signals from the sensors are monitored by the control 90 and used to control solenoid valve 93 interposed between the filter 92 and container 100. The high water level sensor 108 is set so that normally sufficient water, typically about an inch, is over the elements 96, but not so high that their water-to-fog making efficiency drops. Similarly, element 110 serves as an additional safety backup high level control. To avoid interference form the turbulence from elements 96 with the operation of sensors 106-110, a baffle can be inserted within the water 98 to isolate the sensors from the turbulence.

Control 90 also senses when power to system 80 is removed and responds to the loss of power by opening a drain valve 112. This avoids leaving still standing water in the container. Within control 90 a timer can be used to open the drain valve 112 when a signal to activate the ultrasonic elements has not been received for a particularly long interval. Other opening and closing conditions for the drain valve 112 can be used as one skilled in the art can envision.

A fan 94 is used in the embodiment of FIG. 2D to deliver fog into the air stream 24 within the duct 18. Operation of the fan 94 is under the regulation by control 90. This includes for example a sensor 114 used to determine when the air stream 24 is off and utilizes a signal indicative thereof on an input line 116 to turn the fan 94 and the elements 96 off. In this manner fog production is ceased when the heating system operating within the residence or commercial structure turns its air circulation fan off. Flow sensor can be a pitot tube type sensor or a direct electrical connection to the circulation fan to sense its de-activation and activation by the heating system. In either case the output signal on line 116 becomes an enabling signal for control 90 with which it can initiate humidification depending upon operating conditions. Note that a direct electrical connection on line 115 from control 90 to the heating system can be used to activate its air circulation fan when a need for humidity is sensed.

The components as described in conjunction with the embodiment of FIG. 2D are also used with the embodiment of FIG. 2. In some instances there may be sufficient negative pressure available inside duct 18 to "pull" the fog through the conduit 97 to the dispersion tubes 32 so that a fan can either be dispensed with, as shown in FIG. 2E or by merely removing the fan 94 from its opening in container 100, or the size of the fan 94 can be limited to provide just enough boost to assist the flow of fog from the liquid container 100 to the dispersion tubes 32. Normally, however, the presence of an air stream inside the air duct implies some static air pressure within the duct and thus use of a fan to urge the fog into the duct is desired.

The ultrasonic elements 96 are driven by drive circuits as supplied by their manufacturer. These include output components which require cooling to assure the proper drive power for the elements. In the embodiment in FIG. 2A the drive circuits are mounted to a heat sink that is located within the duct 18 and requires their separation from their controls located in a sub-panel. However, once the drivers and control circuits are recombined as in the embodiments of FIGS. 2B, 2C, 2D, and 2F the sub-panel with the heat sink(s) are no longer mounted in the air stream but can be elsewhere such as on the liquid container 100. The drivers and control and heat sinks can thus also be sized to dissipate heat without an air stream present to assist cooling or can be provided with a separate cooling fan for assisting heat dissipation.

The lateral spacing S between adjacent dispersion tubes 32 is selected as shown in FIG. 9 to enable an air stream to move past the openings 32 and pull fog from inside the bore 33. When the spacing S is too small, the static air pressure may rise too high within the duct 18. Yet the spacing preferably is sufficiently small to enhance the flow of air past openings 60 and thus enhance a venture effect to promote the flow of fog from inside the tubes 32. When the spacing is too large the entertainment of fog tends to be lessened. In one embodiment a spacing S of about a half inch was found satisfactory with tubes having a bore size of about one and half inch diameter.

The dispersion tubes 32 as previously mentioned are illustrated as cylindrical in the described Figures. However, as illustrated in FIGS. 10 through 13 other shapes can be employed. In FIG. 10 the cross-sectional shape of a tube 32' is oval and more pointed oval with tube 32" in FIG. 11. The tube openings 60 are preferably located on segments, of the oval shaped tubes, having least curved portions to enhance fog injection into the air stream. At times a rectangular shape as illustrated in FIG. 12 or triangular form in FIG. 13 may be employed. These shapes can be varied with those that are most effective for a particular application to be used.

Figure 15:
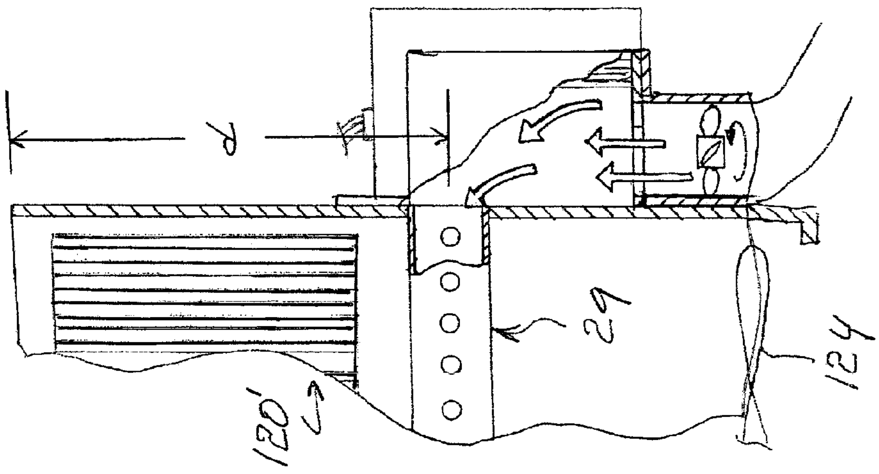
FIG. 15 is a side view in elevation of a humidification system for a stand alone unit wherein fog is inserted from a remote fog generator.
Figure 14:
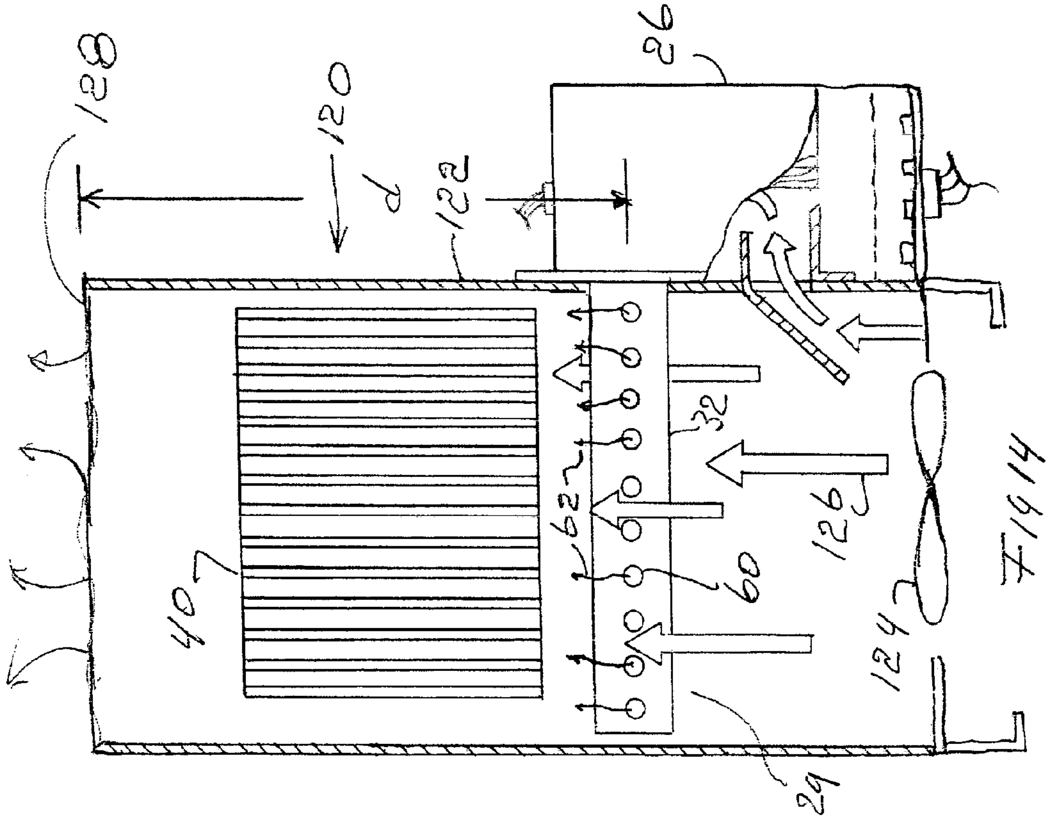
FIG. 14 is a side view in elevation of a humidification system in accordance with the invention mounted to a vertically oriented duct suitable for a stand-alone unit.

With reference to FIGS. 14 and 15 a stand-alone type humidifier 120 is shown. In the embodiment of FIG. 14 a vertically oriented duct 122 has a humidification system generally as shown in FIG. 2A mounted. A fan 124 provides air 126 flow through duct 122. A portion of the air flow is diverted into a fog generator in a housing 26 or like the generator 100 in FIG. 2D. The fog is then passed into a fog dispersal structure 29 that is oriented horizontally. Fog 62 emerges from openings 60 for evaporation into the air-stream 126 produced by fan 124. A particular advantage of unit 120 is that fog is evaporated in a very short distance d that is generally less than about six feet from its insertion point at the fog dispersal structure 29 to the discharge end 128.

The stand-alone unit 120 can be horizontally oriented and the unit can employ a humidification system as depicted in the other FIGS. 2B through 2E. FIG. 15 illustrates the insertion of fog from a conduit 130 with the fog generator not shown because it is at a remote location from the fog dispersal structure 29.

Figure 17:
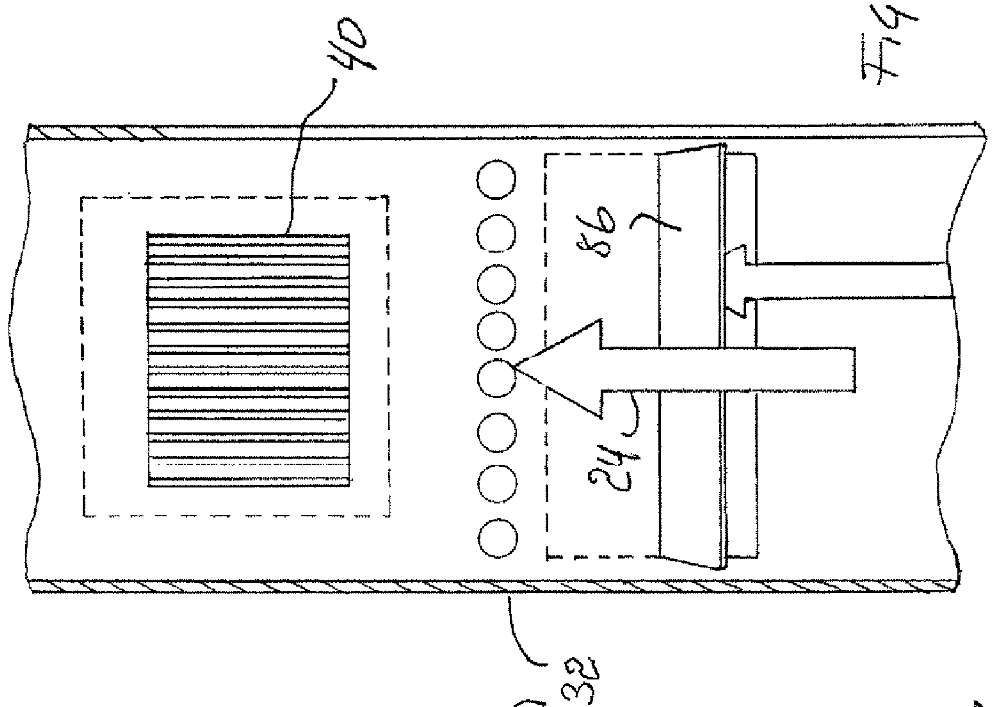
FIG. 17 is a side view in elevation of the vertically duct mounted humidification system of FIG. 16 taken along the line 17-17.
Figure 16:
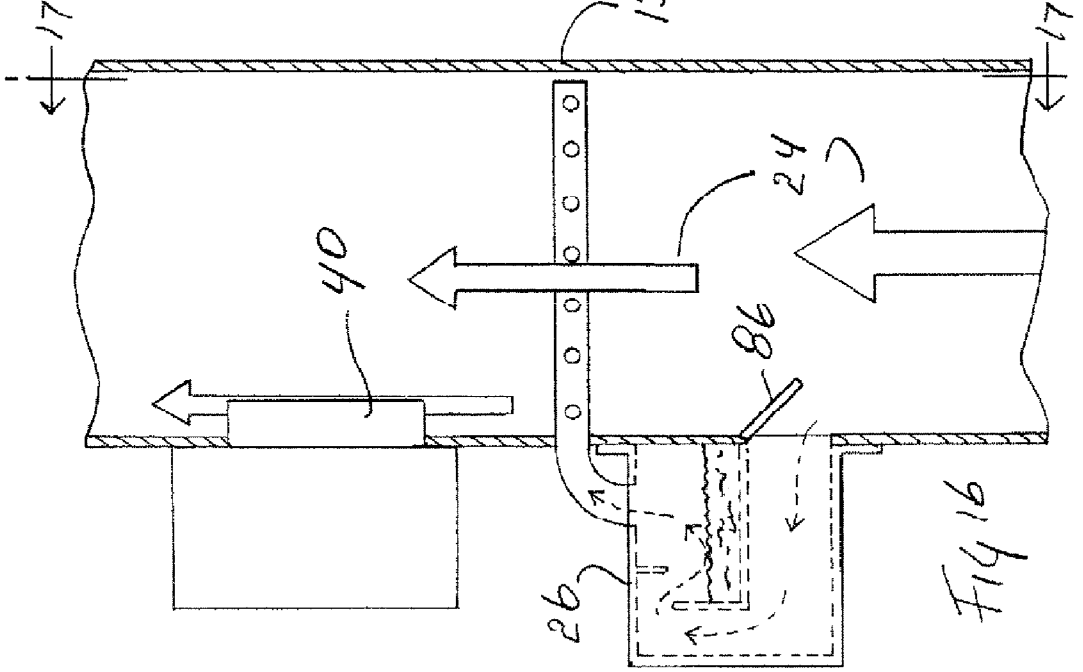
FIG. 16 is a side view in elevation of a vertically oriented duct mounted humidification system in accordance with the invention.

With reference to FIGS. 16 and 17 a humidification system 10 of the invention is shown mounted in a vertical duct 132 with horizontally oriented dispersion tubes 32. The humidification system could be as shown in FIG. 2B or 2C or 2D or 2E or 2F. Use of a remotely located fog generator as shown in some of these Figures is particularly useful.

Figure 18:
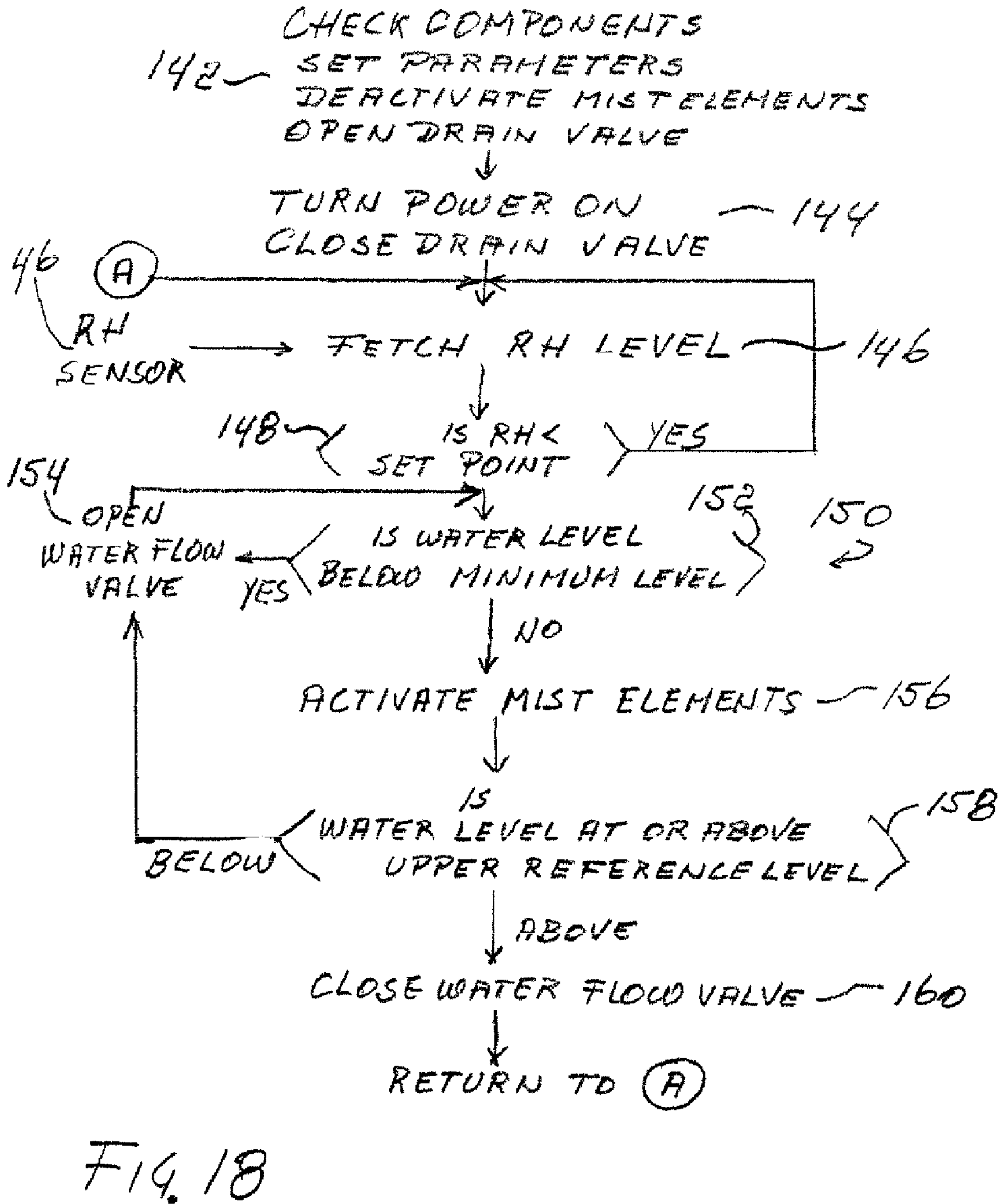
FIG. 18 is a schematic flow chart representation for a control that can be used to operate one form for a humidification system in accordance with the invention.

Operation and control of a humidification system in accordance with the invention can be done with a software operated controller or implemented with relays as was done with an early experimental form of the invention. FIG. 18 illustrates the functions for a control and one skilled in the art can then adapt this to a suitable device. Thus in FIG. 18 at 140 a flow chart is shown to operate a controller 90. At 142 components are checked for proper conditions and parameters set such as the humidity set point for the humidistat 46. At 144 power is turned on which assures that the drain solenoid valve 112 is closed and at 146 the current set point level is fetched to determine at 148 whether the humidification system has reached its set point level. If so, then a return is made to step 146.

If not, a check is made at 150 whether the water level in the container such as 100 is sufficient to actuate the ultrasonic transducers elements 96. The check 150 comprises a test at 152 whether the water level is below the minimum, as indicated by level sensor 106 and if so the water flow valve 93 is opened at 154 and a return is made to step 152 until that shows the water level has risen above the minimum level.

At this time the mist producing elements 96 are energized at 156 while the water level is checked at 158 to determine if it has reached the upper level as sensed by sensor 108. If not a return is made to step 153 after making sure the flow valve 93 is open at 154. If the water level is at its upper range, then the flow valve is closed at 160 and a return is made to step 146.

If for some reason the water flow valve 93 fails to close and water continues to enter container 100, a back up level sensor 110 is actuated to either force a back up solenoid, not shown, to close or to cause an alarm or in some manner avoid an overly high water level in container 100. This can be implemented without an interface with the flow diagram of FIG. 18.

It should be understood that various other operations and safety measures can be incorporated with the flow diagram of FIG. 18 and that all of these can be implemented with either a software logic control or with relay logic as is well known in the art.

Having thus described various embodiments for a humidification system in accordance with the invention its advantages can be understood and appreciated. For example, multiple stacked humidification units can be employed for increased capacity. Variations may be made from the described embodiments while practicing the features of the invention whose scope is to be determined by the following claims.

What is claimed is:

1. An apparatus for applying a fog, formed primarily of fine non-vaporized liquid particles, to humidify a stream of gas passing through a duct, comprising:

a liquid container remotely mounted from said duct;

a plurality of liquid mist producing elements mounted in said container to produce a mist mixture of fog and droplets from liquid within the container at a pressure that is near ambient pressure prevailing outside said liquid container;

a fog dispersal structure being arranged in said duct to extend across at least a part of the stream of gas, said structure having an inlet manifold to receive fog and having fog output apertures in flow communication with said inlet manifold, said apertures in the aggregate being cross-sectionally distributed so as to expose a cross-sectional area of said gas stream to said fog;

a fog conveying conduit connected between said container and said fog dispersal structure, said fog conveying conduit having an inlet and an outlet, with said fog conveying conduit inlet located at said container to receive fog drawn from a plurality of said elements and with said fog conveying conduit being sized and its outlet being located to discharge fog into the inlet manifold of the fog dispersal structure;

said fog dispersal structure apertures being located to receive said fog from the inlet manifold and being further sized and distributed to facilitate said stream of gas within the duct to receive, entrain and absorb a flow of fog from inside the container through said fog conveying conduit to said apertures into and generally uniformly across a cross-sectional part of the gas stream for evaporation of the fog within a short distance from the fog dispersal structure;

wherein said mist producing elements comprise piezoelectric elements; and drive circuits to energize said piezoelectric elements and a heat sink in heat removing relationship with said drive circuits, said heat sink being mounted to said duct for cooling by said humidified gas stream.

2. The humidification apparatus as claimed in claim 1 wherein said conduit is sufficiently long to enable said container to be remotely spaced from said fog dispersal structure and said duct.

3. The humidification apparatus as claimed in claim 1 wherein said fog dispersal structure comprises a dispersion tube having a passage in flow communication with said container and having a plurality of spaced apart apertures sized to enable the fog to pass through at effectively said duct pressure and be injected into the gas stream.

4. The humidification apparatus as claimed in claim 1 wherein said fog dispersal structure comprises a plurality of dispersion tubes extending from said inlet manifold, said tubes having unobstructed hollow passages in flow communication with said inlet manifold and said fog conveying conduit outlet and having a plurality of spaced apart apertures sized to enable the fog to pass through the apertures at effectively said duct's pressure for injection into the gas stream.

5. The humidification apparatus as claimed in claim 1 wherein said container is sealed to prevent fog from leaking and a fan positioned on the container to elevate pressure within the liquid container above duct air pressure near the fog dispersal structure and move fog through said conduit towards the fog dispersal structure.

6. The humidification apparatus as claimed in claim 1 wherein said heat sink is mounted downstream of said fog dispersal structure for enhanced cooling by fog injected into the gas stream.

7. The apparatus as claimed in claim 4 wherein said tubes have their passages sealed at an end to enhance the flow of fog from said openings.

8. An apparatus for humidifying an air stream passing through a duct with a fog formed of fine non-vaporized water particles, comprising:

a plurality of fog dispersion tubes arranged in said duct so that said tubes extend at least partly across the air stream, said tubes enclosing fog passages and being spaced from each other to enable said air stream to flow between them;

a water container mounted in gas flow communication with the passages of said tubes and mounted to said duct;

a plurality of water mist producing elements mounted to said liquid container to convert liquid therein to a mist;

said tubes having a plurality of openings spaced along said tubes and located so as to enable said air stream as it passes said tubes to impart an aspiration effect through said openings to entrain a flow of said fog from inside the tube passages through said tube openings into and across said air stream for its humidification;

a heat sink mounted inside said duct and located downstream of said tubes; and a drive circuit coupled to said water mist producing elements, said drive circuit being in heat conducting relationship with said heat sink, whereby humidified air passes in heat exchanging relationship with said heat sink to remove heat from said heat sink and keep said drive circuit at a cooled temperature.

9. The apparatus as claimed in claim 8 wherein said water container has an input port located so as to be in air flow communication with said air stream at a location that is upstream of said fog dispersal structure to enhance the flow of fog to said tubes.

10. The apparatus as claimed in claim 9 wherein said water container has a diverter facing said air stream to divert air flow into said water container from said duct.

11. The apparatus as claimed in claim 9 and further including a fan placed to supply air through said water container and into said tubes to drive fog through said tube openings into the air stream.

12. A method for humidifying a gas stream passing through a duct with a fog formed of fine non-vaporized liquid particles comprising the steps of:

forming a mist of a liquid with a plurality of mist producing elements and within a container that is at a location that is remote from said duct accruing the mist within the container wherein the mist is formed of droplets and said fog;

moving said fog from the mist in the container through a common conduit to said duct to produce a flow of the fog from the container;

distributing said fog at least partly across the duct to directly and generally uniformly inject the fog into a cross-sectional part of the gas stream in the duct for fog vaporization therein within a short distance from where fog is injected into the duct wherein said mist producing elements comprise piezoelectric elements; and providing drive circuits to energize said piezoelectric elements and providing a heat sink in heat removing relationship with said drive circuits, said heat sink being mounted to said duct for cooling by said humidified gas stream.

13. An apparatus for humidifying a stream of gas passing through a duct with a fog formed of fine non-vaporized liquid particles, comprising:

a liquid fog sealed container remotely mounted from said duct;

a plurality of liquid mist producing elements mounted in said container to produce a mist mixture of fog and droplets within the container;

an elongate conduit coupling the container to said duct and being sized and connected to convey fog generated from a plurality of mist producing elements inside the container into said duct;

a fan mounted to drive air through said container at a pressure that is above static pressure in the duct and through said conduit to deliver said fog to the duct through said conduit;

a plurality of elongate fog dispersion tubes extending into said duct and having fog dispersion openings distributed along their respective lengths within said duct and being arranged in said duct so that said tubes are distributed at least partly across the air stream, said tubes enclosing unobstructed hollow fog passages and being spaced from each other to enable said air stream to flow between them;

with said conduit being in gas flow communication with said fog passages in said tubes and with said openings being distributed along said tubes so as to inject fog in a generally uniform manner across at least said part of the duct and thus enable said gas stream to absorb said injected fog within a short distance from the dispersion tubes;

wherein said mist producing elements comprise piezoelectric elements; and drive circuits to energize said piezoelectric elements and a heat sink in heat removing relationship with said drive circuits, said heat sink being mounted to said duct for cooling by said humidified gas stream.

* * * * *